CHARLES E. JAYCOX, OF SAN FRANCISCO, CALIFORNIA.

Letters Patent No. 88,300, dated March 30, 1869.

IMPROVED FLEA-POWDER.

The Schedule referred to in these Letters Patent and making part of the same.

*To all whom it may concern:*

Be it known that I, Professor CHARLES E. JAYCOX, of the city and county of San Francisco, State of California, have invented a new and useful Flea-Powder; and I do hereby declare that the following is a full description of the same, together with the names and proportions of the ingredients used, and the manner of mixing, or compounding the same, to produce the powder, with directions for its use after preparation.

My invention relates to a drug, or powder for exterminating fleas, and that without any unpleasant accompanying effects, usual to drugs generally used for that purpose, as it will not stain or injure any fabric, no matter how delicate, and it need only be used occasionally, as its effects, even a long while after being applied, are effective for the purpose of destroying the flea.

The ingredients which I use to form the compound, or powder, together with the proportions of each to be employed, are as follows:

*Mentha pulegium,* or pennyroyal, twenty-five (25) per cent.

Snuff, thirty (30) per cent.

*Sinapis,* or mustard, twenty (20) per cent.

Salt, twenty-five (25) per cent.

These ingredients are first taken separately, and ground, in a suitable mill, to a proper degree of fineness. (The degree of fineness is not material.) The pulverized ingredients are then put back in the mill, mixed in the proportions specified, and ground through the mill together, thus thoroughly mixing and incorporating them. The powder is then ready to be put up in the proper packages.

To use the powder, it may be sprinkled over the clothing, carpet, or other fabric which it is desired to free of the flea; and in washing clothing generally, they should be sprinkled with the powder previous to washing, and the effects, even after they are thoroughly washed, will be sufficient to destroy the fleas.

The powder should be used occasionally, on an average of once a week, and its effects will be to entirely free the articles used, and even an entire house, when used liberally, of that annoying tormentor, the flea.

Having thus described my invention,

What I claim, and desire to secure by Letters Patent, is—

The ingredients above enumerated, mixed and compounded in the manner and in about the proportions specified, substantially as and for the purpose herein described.

In witness whereof, I have hereunto set my hand and seal.

PROF. CHAS. E. JAYCOX. [L. S.]

Witnesses:
   GEO. H. STRONG,
   J. L. BOONE.